United States Patent [19]
Ohlig

[11] Patent Number: 4,916,484
[45] Date of Patent: Apr. 10, 1990

[54] GRAPHIC MATERIAL REGISTRATION APPARATUS AND METHOD

[76] Inventor: Ernest Ohlig, 2306 Holiday Rd., Newport Beach, Calif. 92660

[21] Appl. No.: 325,984

[22] Filed: Mar. 20, 1989

Related U.S. Application Data

[63] Continuation-in-part of Ser. No. 131,377, Dec. 12, 1987, Pat. No. 4,812,883.

[51] Int. Cl.⁴ .............................................. G03B 27/20
[52] U.S. Cl. .................................................... 355/91
[58] Field of Search ................ 355/83, 85, 53, 91, 355/93, 94, 104, 122; 354/299; 248/362

[56] References Cited

U.S. PATENT DOCUMENTS

| | | | |
|---|---|---|---|
| 3,658,014 | 4/1972 | Kranz et al. | 355/91 X |
| 3,890,042 | 6/1975 | Miyauchi et al. | 355/53 |
| 3,955,163 | 5/1976 | Novak | 355/91 X |
| 3,995,955 | 12/1976 | Töpfer | 355/91 |
| 4,029,404 | 6/1977 | Mizukami et al. | 355/91 |
| 4,054,383 | 10/1977 | Lin et al. | 355/91 |
| 4,360,266 | 11/1982 | Takeuchi | 355/91 |
| 4,423,851 | 1/1984 | Heitmann | 355/91 X |
| 4,484,813 | 11/1984 | Maher et al. | 355/94 X |
| 4,551,016 | 11/1985 | Maher et al. | 355/91 |
| 4,604,800 | 9/1971 | Jordan et al. | 355/91 |
| 4,674,868 | 6/1987 | Theimer | 355/122 |
| 4,705,392 | 11/1987 | Ohlig | 355/91 |
| 4,707,125 | 11/1987 | Ohlig | 355/94 |
| 4,754,309 | 6/1988 | Lesko | 355/91 |
| 4,812,883 | 3/1989 | Ohlig | 355/91 |

Primary Examiner—Richard A. Wintercorn
Attorney, Agent, or Firm—A. C. Smith

[57] ABSTRACT

Improved method and apparatus for supporting photographic sheet materials in intimate surface contact during contact exposure includes a flexible membrane which forms a common boundary wall between two gas-tight chambers. Air at ambient pressure is admitted to one chamber at a controlled rate slower than air is evacuated from the other chamber containing the photographic sheet materials. Progressive expansion of the surface area of contacting force assures that residual volumes of air between photographic sheets are sneezed out in an orderly pattern and not trapped in isolated pockets that distort resulting photographic images.

14 Claims, 11 Drawing Sheets

GRAPHIC MATERIAL REGISTRATION APPARATUS AND METHOD

RELATED APPLICATION

This application is a continuaton-in-part application of pending application Ser. No. 131,377 entitled "Graphic Material Registration Apparatus And Method," filed on Dec. 12, 1987 by Ernest Ohlig now U.S. Pat. No. 4,812,883, issued Mar. 14, 1989.

BACKGROUND OF THE INVENTION

This invention pertains to the method and means for firmly supporting photographic materials in accurate registration during contact exposure, and more particularly to a passive hold-down apparatus and method in which the region beneath an impervious membrane is selectively evacuated in a manner that develops a spreading or migrating hold-down force.

Contact exposure of photographic copy and master sheets requires accurate registration between such sheets during exposure. Certain known schemes rely upon the sheets being pressed together and against an exposure plate by various mechanisms in order to maintain the sheets in accurate registration during exposure through the exposure plate. One known mechanism depends upon a flexible, weighted blanket being rolled out over the photographic sheets to hold them in place on the exposure plate. Still other known mechanisms rely upon air pressure or resilient means to force the photographic sheets together and against the exposure plate during exposure. Mechanisms of these types are disclosed in the literature (see, for example, U.S. Pat. Nos. 4,029,404 and 4,551,016 and 4,674,868 and 4,707,125).

One common disadvantage associated with mechanisms of these types is that air pockets may remain at random locations between the photographic master and copy sheets and between the exposure plate and sheets that may produce distorted photographic images due to non-contacting reproduction where the air pockets are located. Excessive pressure applied to the photographic sheets to assure that no air pockets remain unnecessarily increases the weight, strength and costs of the exposure plate and associated supporting structures, in order to withstand the pressing forces, and may contribute to distortion of the sheets which may be forced to 'flow' and reform around an air pocket. Even dimensionally stable photographic sheets may stretchd to some extent when pulled unevenly, and may be shifted out of position and registration when pressure is applied and covering blanket shifts or stretches. In addition, excessive pressure applied to photographic sheets, particularly of plastic materials, introduces stresses which may form Newton rings in the reproduction, especially under exposure to collimated light.

SUMMARY OF THE INVENTION

In accordance with the present invention, a passive, pressure differential is established about a flexible membrane that covers the photographic sheets and the exposure plate in a manner that assures removal of air pockets from between the photographic sheets as the force attributable to ambient air pressure is progressively applied. A migrating or spreading region of applied force progressively squeezes out residual air from between the photographic sheets and inhibits entrapment of air within pockets at random locations. The sheets are therefore placed and held in intimate contact with substantially uniform force over the area of the sheets and exposure plate. In another embodiment of the invention one or more layers of porous resilient material are disposed between the sheets of photographic material and the vacuum blanket to facilitate migration of entrapped air from beneath the blanket to a vacuum port. Also, the blanket is prepared with a layer of non-stretch material to stabilize the dimensions thereof as the pressure differential exerts deforming force against the outer surface of the blanket.

DESCRIPTION OF THE PREFERRED EMBODIMENT

Figure 1:
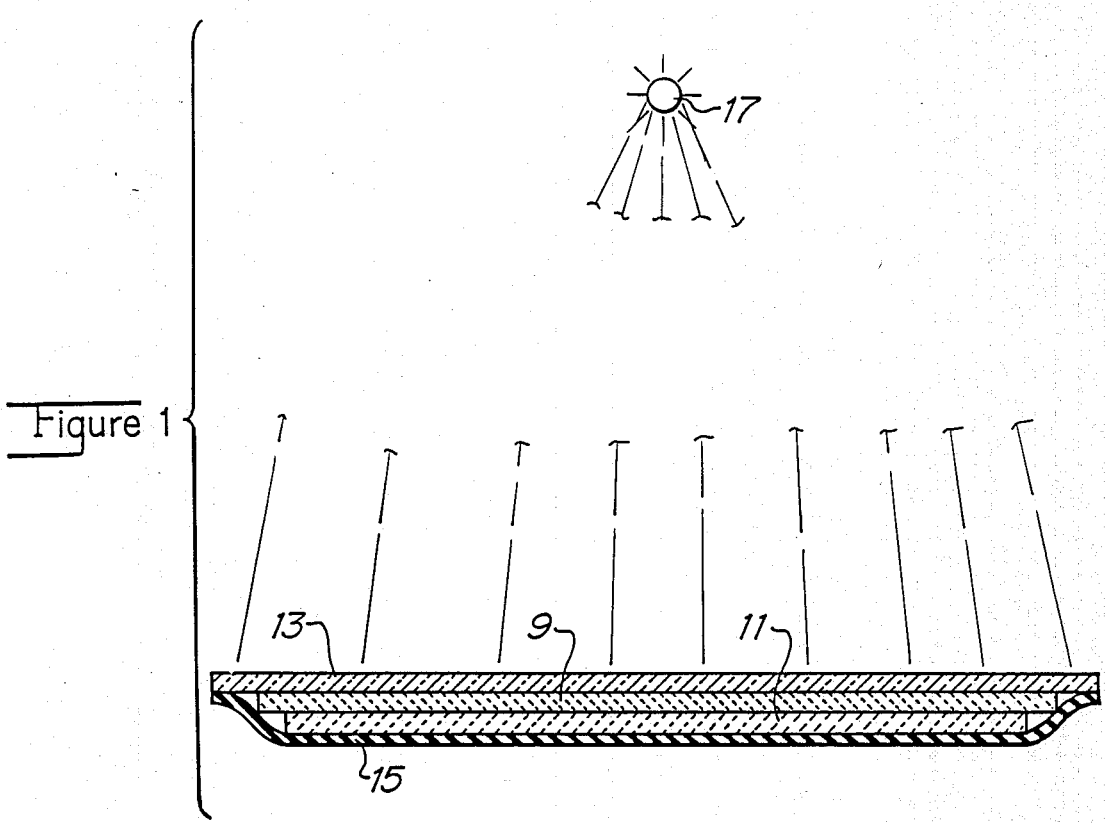
FIG. 1 is a sectional view of exposure apparatus including sheets of photographic material retained against the exposure plate by a flexible blanket.

Referring now to FIG. 1, there is shown a cross-sectional view of a sheet 9 carrying photographic original images and another sheet 11 of photographically-sensitive materials held together and in place against a glass exposure plate 13 by a flexible blanket 15. The sheet materials 9, 11 are held in close surface registration during exposure through the glass plate 13 to a light source 17 positioned above the plate. Structures of this type may also be achieved in inverted orientation when the sheet materials are placed on top of the exposure plate and the flexible blanket 15 weighs down the sheets during exposure to the light source located below the glass plate.

Figure 2:
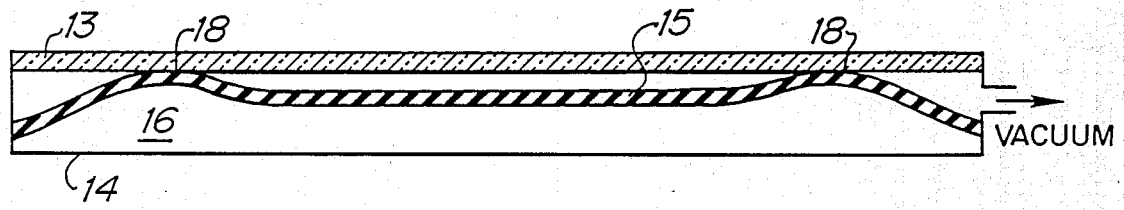
FIG. 2 is a sectional view of vacuum hold-down apparatus illustrating a pocket of air trapped beneath sheets of photographic material.

With reference to the sectional view of FIG. 2, the flexible blanket 15 and photographic sheet materials positioned between the blanket and exposure plate 13 are forced against the glass exposure plate 13 by positive air pressure acting within the chamber 16 on the side of the blanket 15 remote from the plate 13. The positive pressure differential may be established by pressurizing the chamber 16 (within the confining housing 14). However, such techniques commonly isolate pockets of trapped air at locations on the surface of the sheet materials where sufficient air-tight seals 18 formed against the exposure plate (or between sheets) to inhibit evacuation of such volumes of residual air.

In accordance with the present invention, a flexible, gas-impervious blanket to membrane 15 is disposed to separate two air-tight chambers that are formed on opposite sides of the membrane, with the membrane forming a boundary wall of each such chamber, as shown in FIGS. 3(a) through (e). In the first or upper chamber 19, another boundary wall is formed by the exposure plate 13 (which may be hinged or otherwise removable 29 [not shown] to facilitate insertion of photographic sheet materials into the chamber). In the second or lower chamber 20, a controlling air inlet 21 is positioned in an exterior boundary wall 22 of that chamber to limit the ingress of air at ambient pressure into the second chamber. The membrane 15 may be secured and sealed 23 about its periphery to the exterior boundary wall 22 in order to form therewith the air-tight second chamber 20. The first chamber 19 is coupled to a vacuum pump (not shown) for evacuating air 24 from between the sheets 9, 11 and from between the sheets and exposure plate 13 in order to assure fixed surface registration between the two sheets during exposure to light through the exposure plate 13.

Figure 3:
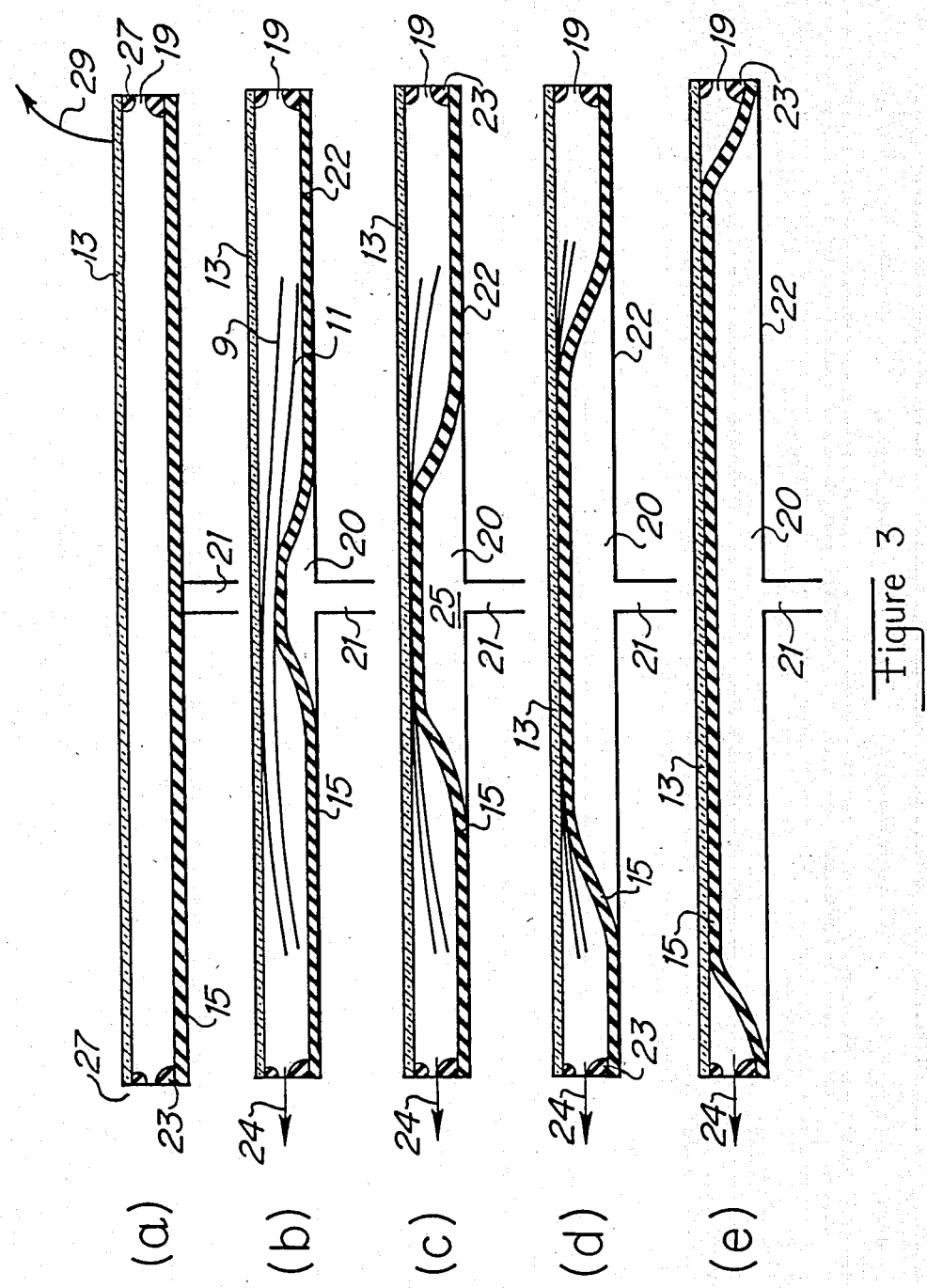
FIGS. 3(a) through (e) are sectional views of apparatus according to the present invention operating to exclude residual air.

In operation, the inlet 21 limits the rate of flow of air at ambient pressure into the second chamber 20 that is formed beneath the membrane 15. Thus, as air is evacuated 24 from the first chamber 19 above the membrane 15, substantially only the local region of the membrane 15 about the inlet 21 is capable of expanding under the pressure differential between ambient pressure admitted into the second chamber 20 through the inlet 21 and the reduced pressure due to evacuation of air 24 evacuated from the first chamber. The inlet 21 is positioned within the periphery seal 23 of the membrane, as shown in FIG. 3, so that initial expansion of the volume of the second chamber 20 (via flexure of the membrane 15) is limited substantially to the central region 25 about the inlet 21. As evacuation of the first chamber continues, the volume of the second chamber (via flexure of the membrane 15) continues to expand or spread over the surface of the exposure plate 13, as illustrated in FIGS. 3(c) through (e), until the entire surface area of the sheets 9, 11 are progressively pressed together and against the exposure plate 13.

Figure 5:
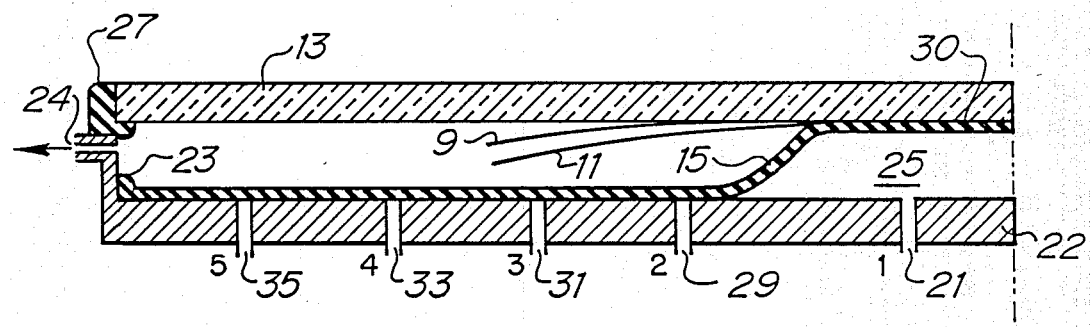
FIG. 5 is a partial sectional view of the apparatus of the present invention for incrementally controlling the migrating hold-down force.
Figure 4:
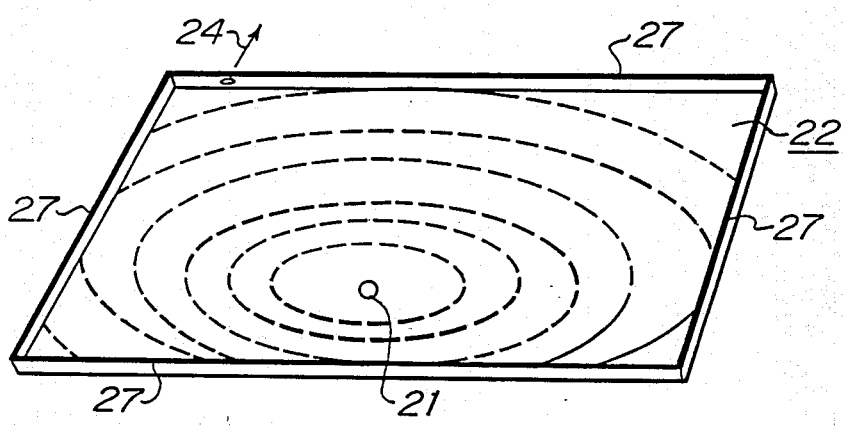
FIG. 4 is a perspective plan view of the lower support plate and air inlet according to the present invention.

Ideally, the rate of flow of air at ambient pressure through inlet 21 into the second chamber is slower than the rate of flow of air 24 from the first chamber 19 (via a vacuum pump not shown) so that a pressure differential can be maintained across the membrane 15 under conditions which cause progressive, migrating or spreading contact between the membrane 15 and the sheets 9, 11 and the exposure plate 13 from the central location of the inlet 121 toward the periphery of the membrane 15, as illustrated in FIGS. 3(b) through (e). The first chamber may be evacuated through an outside boundary wall, as illustrated in FIGS. 4 and 5, for example, near the perimeter of the membrane 15. In this way, substantially all residual air within the first chamber 19 that might remain between the sheets 9, 11 and between the sheets and the exposure plate 13 and membrane 15, is squeezed out progressively, starting near the inlet 21 and concluding at the perimeter of the membrane 15. The initial surface force is applied at the central position, as shown in FIGS. 3(b) and (c), and spreads out with time, as shown in FIGS. 3(d) and (e), as air at ambient pressure is admitted to the second chamber 20 at controlled rates through the inlet 21.

Referring now to FIG. 5, the partial sectional view of the apparatus of the present invention illustrates a plurality of air inlets 29, 31, 33 and 35 at spaced locations intermediate the substantially central inlet 21 and the peripheral seal 23 of the membrane 15 to the lower platen 22. Each of these inlets restricts the flow of air at ambient pressure into the forming chamber 25 as the membrane 15 expands the area 30 in which force is applied to urge the sheets 9, 11 into surface contact with the exposure plate 13, as more fully described later herein with reference to FIG. 6. Initially, as air is evacuated 24 from the region between the membrane 15 and the exposure plate 15, air at ambient pressure enters beneath the membrane 15 initially only through inlet 21. The remaining inlets 29–35 are blocked by the membrane 15 or by active valving techniques, as later described. Thereafter, as the region 25 expands below membrane 15, air enters beneath the membrane 15 additionally through each of the inlets 29, 31, 33 and 35 in turn, so that the rate of expansion of the region 25 beneath the membrane 15 increases with time as air continues to be evacuated 24 from the region between the membrane 15 and the exposure plate 13. The pressure differential thus established across the membrane 15 progressively squeezes out residual air from between the photographic sheets 9, 11 and exposure plate 13 in a pattern that generally progresses from the central location of the initial air inlet 21 toward the outer limits of the peripheral seal 23 of the membrane 23 to the lower platen. The perimeter gasket 27 is provided to facilitate removal of the exposure plate 13 for convenient placement of photographic sheets 9, 11 within the upper chamber, and to form an air-tight seal with the exposure plate 13 when it is in place, as shown.

After exposure of the photographic materials to light through the plate 13, air at ambient pressure may be admitted into the first chamber 19, initially from locations about the periphery of the membrane 15 to progressively decrease the area in which surface force of the membrane 15 (and confined sheets 9, 11) against the exposure plate 13 is removed, substantially in the sequence illustrated by FIGS. 3(e) through (a), in that order. After the air 19, 20, pressure equilibrates in the first and second chambers 19, 20, the exposure plate 13 may be removed as a boundary wall of the first chamber (for example, by detachment from perimeter gaskets 27, as shown in FIG. 4) in order to facilitate removal of the sheets 9, 11 and placement of new photographic materials for contact exposure.

Figure 6:
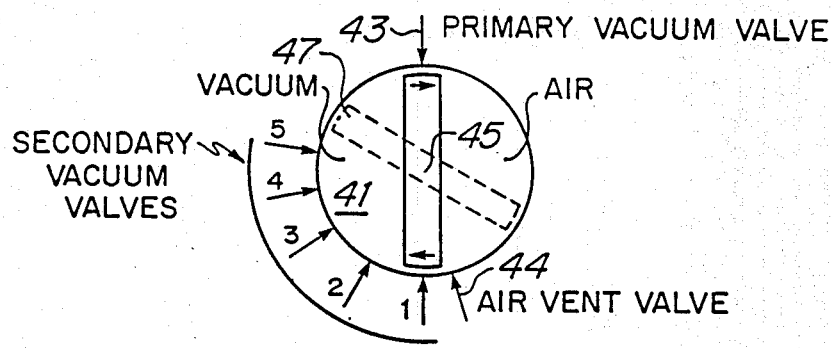
FIG. 6 is a pictorial representation of a control valve for the embodiment of FIG. 5.

Referring now to FIG. 6, there is shown a simplified pictorial representation of a sequential valving scheme that operates with the inlets 21 and 29-35 to control the migrating positioning of the membrane 15 against the exposure plate 13. In operation, each of the inlets 21 and 29-35 (designated 1, 2, 3, 4 and 5 in FIG. 5) are connected to the valve chamber 41, 42 that is coupled to a vacuum supply at conduit 43 and a supply of air at ambient pressure via conduit 44. A rotatable plenum 45 is disposed to separate the different air pressures in the valve chamber 41, 42 and to divert either vacuum or air at ambient pressure to the inlets 21 and 29-35 in sequence. Thus, by rotating the plenum 45 in clockwise direction, vacuum in chamber 41 is removed from inlet 21 and air at ambient pressure is supplied via chamber 42. Similarly, vacuum is removed from each of the remaining inlets 2-5 and air at ambient pressure is supplied thereto as the plenum 45 continues to rotate. When the plenum 45 is positioned 47 to assure that air at ambient pressure from chamber 42 is supplied to all of the inlets 1-5, the membrane 15 in FIG. 5 (together with the photographic sheets 9, 11) is urged against the exposure plate 13 with the full force of the pressure differential across it.

After exposure operations and the photographic sheets 9, 11 are to be removed, the plenum 45 may be rotated counter-clockwise to connect vacuum in chamber 41 to the inlets 5, 4, 3, 2, and 1 in that sequence. The membrane 15 is thereby drawn away from the exposure plate as air at ambient pressure is admitted to the region between the membrane 15 and exposure plate 13. Once the air pressures on both sides of the exposure plate 13 have equilibrated, the exposure plate 13 may be removed to facilitate removal and re-placement of photographic sheets 9, 11.

Figure 7:
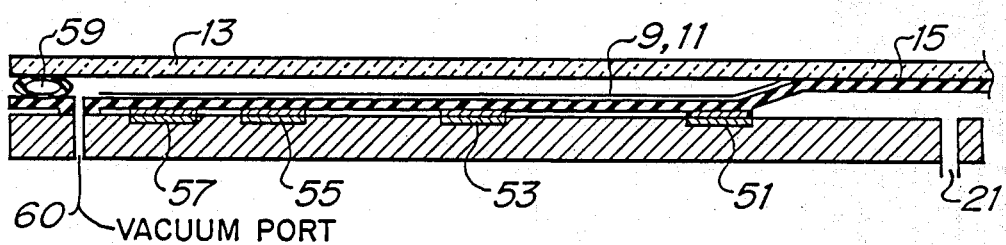
FIG. 7 is a partial sectional view of another embodiment of the apparatus of FIG. 5.

With reference now to the partial sectional view of FIG. 7, there is shown another embodiment of the present invention in which the membrane 15 includes magnetic hold-down means 51-57 spaced at radial or other increments about a central location of an air inlet 21. Of course, these hold-down means 51-57 may include ceramic magnets embedded in the rubber or plastic membrane 15 (similar to gasket construction for refrigerators) for attractive hold-down on the lower platen formed of steel or other magnetic material. Alternatively, flat rings or strips of magnetic material may be positioned within the membrane 15 about the central location of the air inlet 21 for attractive hold-down by permanent magnets positioned in the lower platen to attract the rings or strips of magnetic material.

Figure 8:
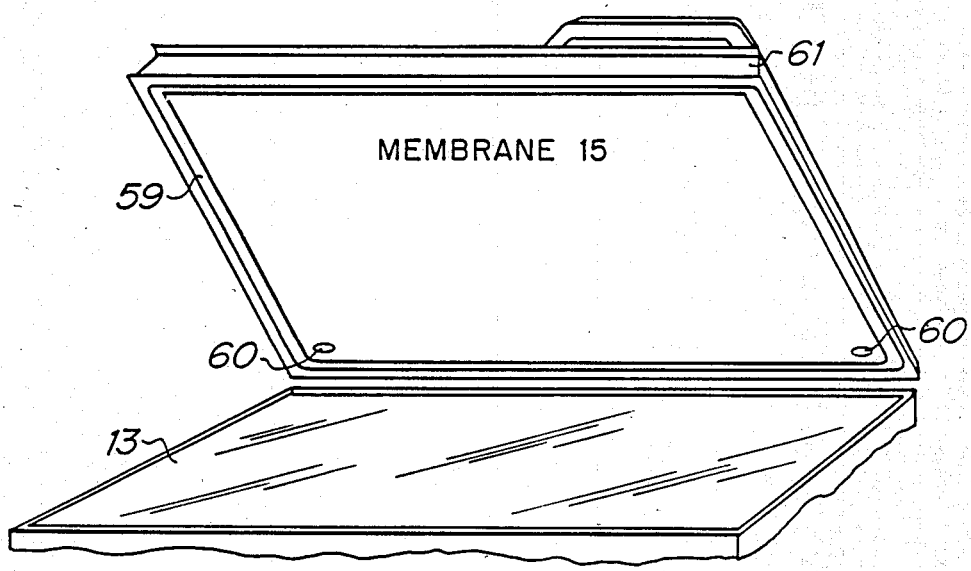
FIG. 8 is a pictorial representation of one exposure apparatus for selectively processing photographic sheets upon a surface platen that is illuminated therethrough from below.

In another embodiment of the present invention, the hold-down means between membrane 15 and the lower platen may include a plurality of resilient filaments connected between the membrane 15 and the lower platen to resiliently bias the membrane 15 away from the exposure plate 13 until evacuation of air from between the exposure plate 13 and the membrane 15 establishes a holding force against the exposure plate 13 that migrates from the central region about air inlet 21 toward the perimeter of the membrane 15 near the seal 59. With reference to the embodiment of the invention illustrated in FIG. 8, the resilient filaments or magnetic hold-down means previously described are particularly advantageous to include with a flexible membrane 15 that is positioned in inverse relationship above the exposure plate 13 that is arranged for exposing photographic sheets therethrough to a light source located below the plate 13. In this embodiment, the membrane 15 is retained in the removable lid 61 that forms the second chamber on the back side of the membrane 15 (inverse of FIGS. 2-5) via a plurality of resilient filaments 63, as illustrated in FIGS. 9(b) through (d) of course, such filaments 63 may be spaced at selected locations and provide graduated resilient force from the least forces near the center to the greatest force near the perimeter of the membrane 15 in order to enhance the migration of the contacting region of the membrane 15 against the sheets 9, 11 and exposure plate 13 as the air therebetween is evacuated.

Referring now to FIG. 9(a), there is shown a partial sectional view of an improved membrane 15 according to the present invention. Specifically, the membrane 15 is illustrated as including at last two distinctive regions, each with distinctively different physical characteristics. In the central region 71, the membrane comprises a dimensionally-stabilizing flexible medium such as DACRON or fiberglass woven cloth 72 that is impregnated with resilient and gas-impervious rubber or other similar polymeric material, with such polymeric material also providing a resilient facing on the membrane 15 for contacting sheets 9, 11.

In the surrounding or perimeter region 73 about the central region 71 near the perimeter seal 59, the resilient and gas-impervious rubber portion of the membrane 15 extends continuously to the seal 59, but is formed to exhibit highly flexible characteristics in lateral and longitudinal directions. This may be accomplished by omitting the impregnated woven cloth 72 that is present in the central region 71, or by reducing the thickness of the rubber layer that forms the membrane 15 in the perimeter region 73, or by combinations of such features that assure highly flexible, but dimensionally variable continuation of the membrane 15 throughout the perimeter region 73. Of course, the exterior boundary wall 22 of the removable lid 61 is disposed on the side of the membrane 15 that is opposite the exposure plate 13 to provide the support for the membrane 15 via the resilient filaments 63, or in accordance with any of the embodiments previously described herein. Thus, with the sheets 9, 11 of photographic material positioned on the exposure plate 13 (on registration pins not illustrated), the dimensionally-stable central region 71 initially contacts the sheets 9, 11 and presses them against the exposure plate 13, as illustrated in FIG. 9(b), as the region between the membrane 15 and the exposure plate 13 is evacuated in a manner as previously described. Thereafter, as the portion of the central region 71 of the membrane 15 that contacts the sheets 9, 11 expands under continuing evacuation, as illustrated in FIG. 9(c), lateral migration of the membrane 15 relative to the sheets is inhibited by the dimension-stabilizing material 72 so that one or more of the sheets 9, 11 that register with the membrane 15 cannot be pulled or moved or distorted relative to any other sheets that register with the exposure plate 13. The dimension-stabilizing material 72 may therefore include cloth threads or strips oriented in at least two orthogonal directions, and additionally in the diagonal directions, or may include a thin metal or Mylar layer that is substantially and uniformly dimensionally stable in all directions within the plane of the layer.

As evacuation of the region between the membrane 15 and the exposure plate 13 continues, as illustrated in FIGS. 9(c) and (d), the perimeter region 73 of the membrane 15 is drawn into contact with the exposure plate 13, causing substantial departure from the initial substantially planar configuration of the membrane 15 and requiring lateral elongation of the membrane 15 in the perimeter region 73 to conform to the resultant shape. However, since the central region 71 of the membrane 15 is laterally inflexible, all distortion or lateral elongation of the membrane 15 occurs only in the perimeter region 73 which is beyond the boundary dimensions of the captivated sheets 9, 11.

Therefore, the apparatus and method for supporting photographic sheet materials for contact exposure according to the present invention substantially eliminates air pockets that tend to distort the photographic images on the sheets. In addition, the apparatus is reduced in weight and strength and cost by efficiently using ambient air pressure to provide the requisite surface-oriented holding forces between the photographic sheets and exposure plate.

Figures 10, 11:
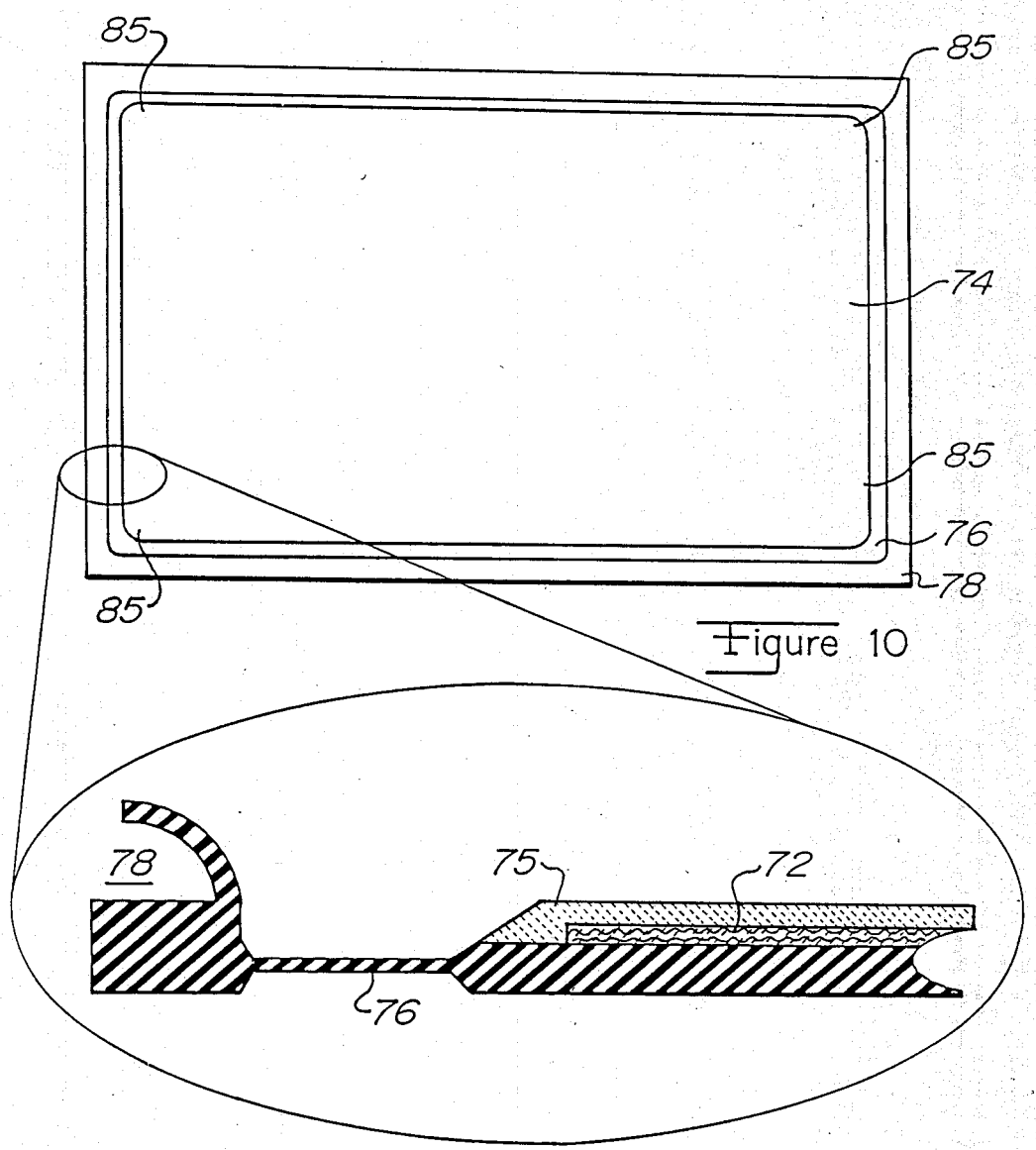
FIG. 10 is a plan view of another embodiment of the impervious membrane having a central section formed with a highly flexible peripheral section and a perimeter gasket section.
FIG. 11 is a partial sectional view of the embodiment of FIG. 10 illustrating the perimeter and peripheral and central sections of the membrane with a soft, pliable layer disposed in the central section to contact a photographic sheet.

Referring now to FIG. 10, there is shown a plan view of the vacuum blanket according to the present invention that includes a central section 74 surrounded by a highly flexible peripheral section 76 that attaches to the perimeter section 78 which forms the gas-impervious seal against the glass platen 13. As illustrated in the partial sectional view of FIG. 11, the central section 74 of the membrane includes a dimensionally-stable and flexible layer 72 of non-stretch material such as a sheet of metal or a sheet of a woven fabric such as Dacron or Kevlar, which non-stretch layer may either be embedded in the central section or disposed as an external layer, as illustrated. The central section also includes a layer 75 of soft, pliable material such as polyurethane foam or Ethnafoam material that is capable of resiliently conforming about the edges and over the surface of a photographic sheet disposed between the layer 75 and the glass platen 13. The peripheral section 76 provides a high degree of flexibility to allow the central section of the membrane to locate properly against the photographic sheet and glass platen as vacuum is drawn without imparting dislocating stresses on the photographic sheet. The perimeter section 78 provides the vacuum seal against the glass platen, and a plurality of registration pins 85 may be located near the corners of the central section 74.

Figure 9:
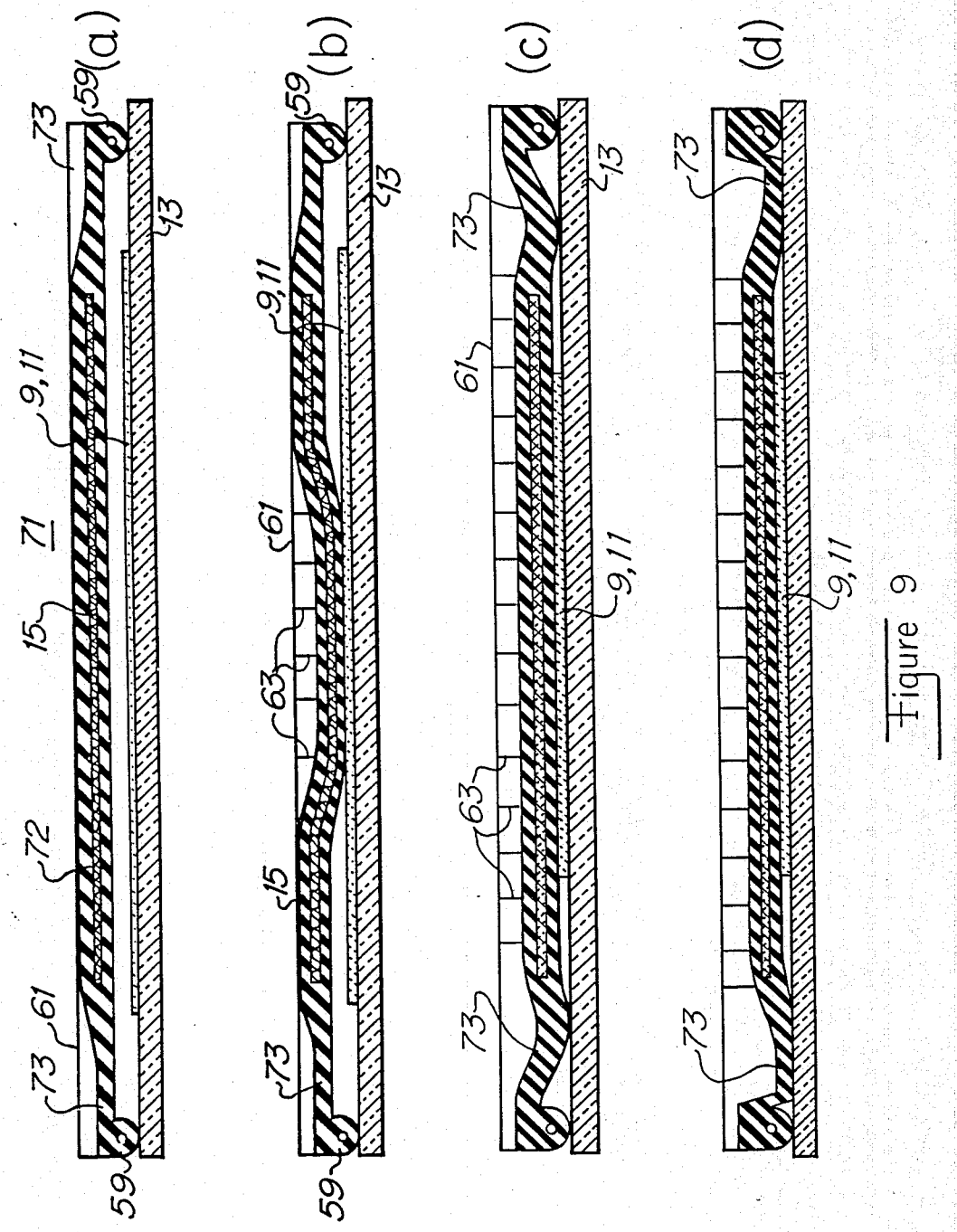
FIGS. 9(a) through (d) are partial sectional views of the improved impervious membrane according to the present invention.
Figure 12:
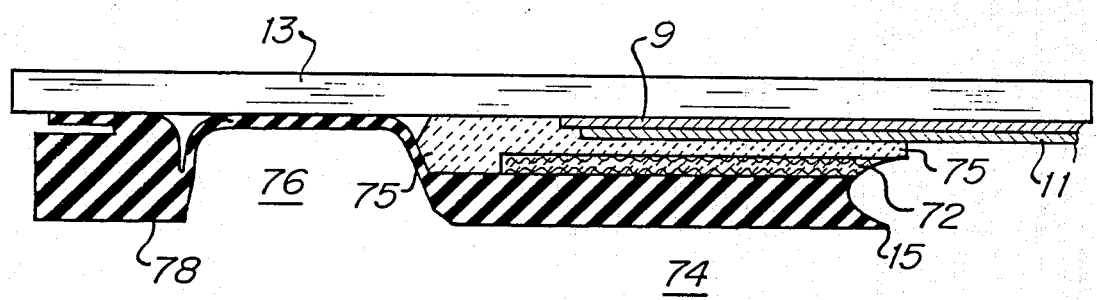
FIG. 12 is a partial sectional view of another embodiment of the impervious membrane having a soft, pliable inner layer and a highly flexible perimeter section.

Referring now to FIG. 12, there is shown a partial sectional view of another embodiment of a vacuum blanket of the type illustrated in FIG. 9(d) including a soft, pliable inner layer 75 disposed between the photographic sheets 9, 11 and the central region of the blanket 15 that contains the dimensionally stable or non-stretching layer 72. The blanket is illustrated in the condition of full vacuum applied, with the soft, pliable layer 75 taking up the requisite volumetric deformation around anomalies such as around registration pins (not shown) and around the ends of the photographic sheets 9, 11. The vacuum blanket is firmly secured in place via attachment to the perimeter or gasket section 78 that is spatially removed from the central section 74 of the photographic sheets 9, 11 by the highly flexible section of the blanket 76 (shown fully deformed into place under full vacuum pressure differential). As the vacuum pressure differential increases, the central section 74 of the blanket presses the photographic materials 9, 11 together against the glass platen 13 with the soft, pliable layer 75 on the topside of the blanket conforming against the glass platen 13 around the outer edges of the sheets 9, 11. The center of the blanket 15 does not need to stretch or shift or pull in any direction because the flexible peripheral section 76 between the central section 74 of the blanket and the perimeter section 78 absorbs the stress and yields adequately to relieve the displacing stresses. The layer 72 of non-stretch material may be disposed outside of the blanket (as illustrated) or embedded within the blanket, as illustrated FIG. 9. The non-stretch material 72 may include a sheet of metal or a sheet of woven fabric such as Dacron or Kevlar which exhibits a high degree of dimensional stability.

Figure 13:
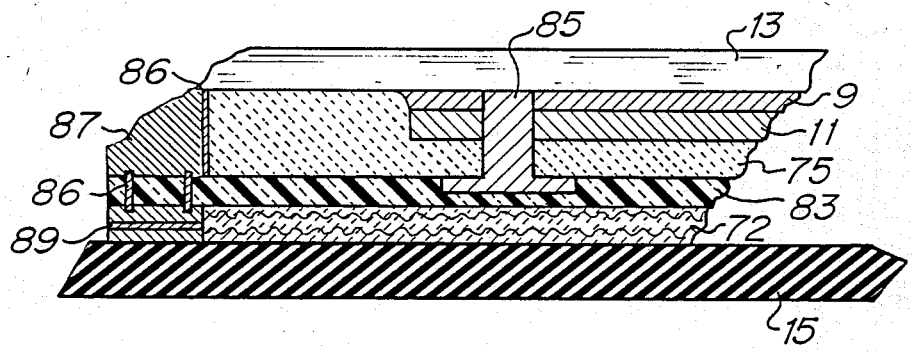
FIG. 13 is a partial sectional view of another embodiment including air-porous layers and perimeter attachments to the membrane.

Referring now to FIG. 13, there is shown a partial sectional view of another embodiment of the present invention which includes an additional layer 83 of porous material interposed between the soft, pliable layer 75 and the vacuum blanket 15. This layer of porous material provides air passageways from around the photographic materials 9, 11 to a vacuum port (not shown) within the volume confined under the vacuum blanket 15. The material may include reticulated foam material or fiberglass matting, or the like, that exhibits porosity in the vertical direction as well as in the lateral directions. The soft pliable layer 75 in this embodiment is also formed of porous material of the types described above to facilitate removal of residual volumes of air about the photographic sheets 9, 11 as vacuum pressure differential is increased.

In the embodiment illustrated in FIG. 11, the glass platen 13 is disposed to set down upon the photographic sheets 9, 11 which are first accurately positioned on the registration pins 85 (one shown) that are secured to the blanket assembly. The porous layers 75 and 83 therefore facilitate the evacuation of the small residual volumes of air that remain about the photographic sheets 9, 11 as the vacuum is drawn without stressing the photographic sheets or altering their relative positioning as the blanket squeezes the sheets together. This is accomplished because in the first phase of drawing vacuum, the majority of the entrapped air is removed without the soft pliable layer 75 binding the edges of the photographic sheets 9, 11. As the pressure differential increases, the soft, pliable layer 75 conforms to the edges of the sheets 9, 11 and adheres to the glass platen 13. However, any remaining air easily escapes through the porous materials 75 and 83 and is evacuated at the vacuum port (not shown) under the blanket 15, thereby greatly facilitating removal of all remaining residual air pockets.

The layered blanket assembly in the illustrated embodiment of FIG. 13 may be disposed to be removed and replaced easily for cleaning, repair and replacement by gluing or otherwise attaching 86 the layers 75 and 83 to a perimeter support and fastener 87. This support and fastener includes a resilient gasket 87 that is attached via conventional resilient tongue-and-groove or hook and loop fastener 89 to the blanket 15 within the central section thereof. Since the forces involved in holding the photographic sheets 9, 11 are created by the pressure differential across the blanket assembly, the sheets 9, 11 and the glass platen 13, then the accuracy of registration of the sheets is not affected by the fastening mechanism including the gasket 87 and the fastener 89.

Figure 14:
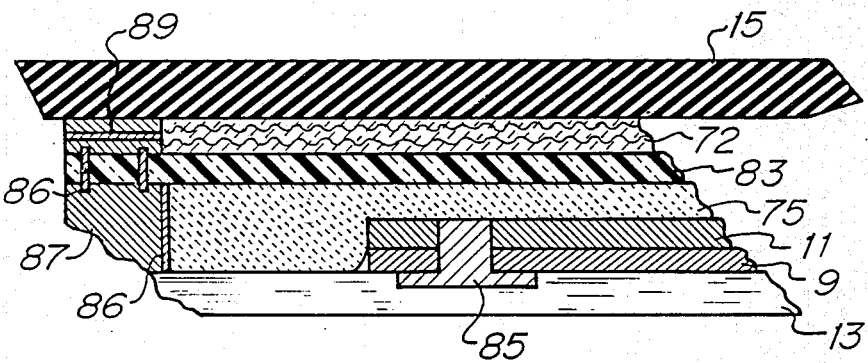
FIG. 14 is a partial sectional view of an embodiment similar to the embodiment illustrated in FIG. 11 in which registration pins are located in the glass platen.
Figure 15:
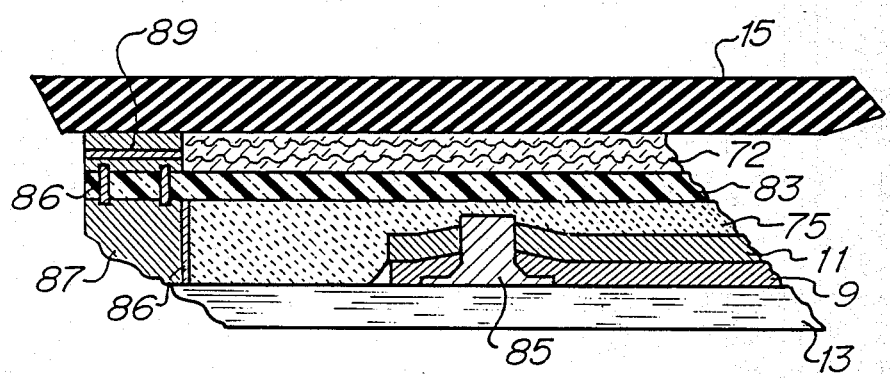
FIG. 15 is a partial sectional view of the embodiment of FIG. 12 in which the registration pins are mounted on the glass platen.

Referring now to FIG. 14, there is shown a similar embodiment in which the blanket is disposed to set down upon the photographic sheets 9, 11 that are initially positioned in proper registration upon the registration pins 85 (one shown) which are embedded in the glass platen 13. Alternatively, as illustrated in the embodiment of FIG. 15, the the registration pins 85 may be mounted on the surface of the glass platen 13, and the soft pliable layer 75 in this embodiment conforms to the irregular shapes about the pins 85 as vacuum pressure differential increases.

Figure 16:
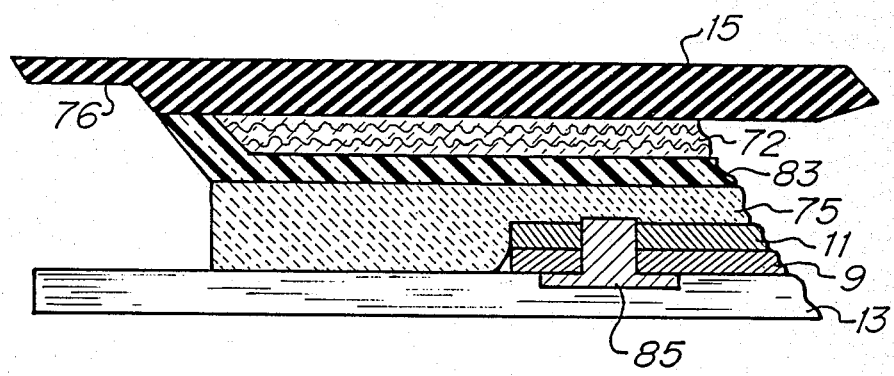
FIGS. 16 and 17 are partial sectional views of other embodiments of the invention including multiple layers of porous and dimensionally-stable materials.
Figure 17:
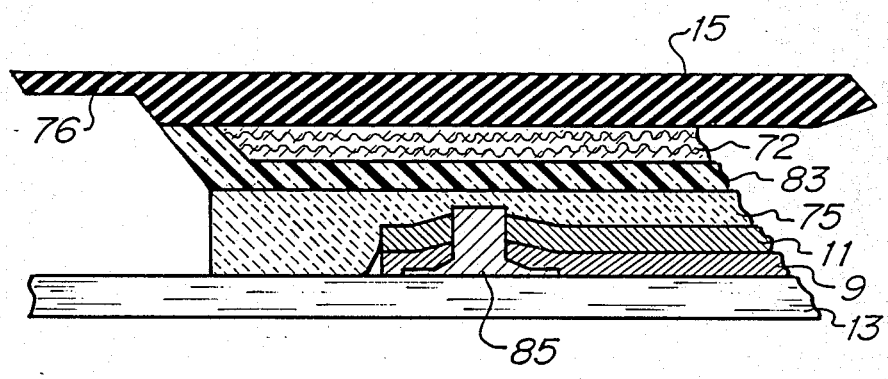

Referring now to FIGS. 16 and 17, there are shown partial sectional views of additional embodiments of the present invention in which the layers of non-stretch material 72, and porous material 83, and pliable, porous material 75 are all attached to the flexible rubber blanket 15 which includes the peripheral section 76 of reduced thickness to provide the highly flexible perimeter, as described with reference to FIG. 12.

Figure 18:
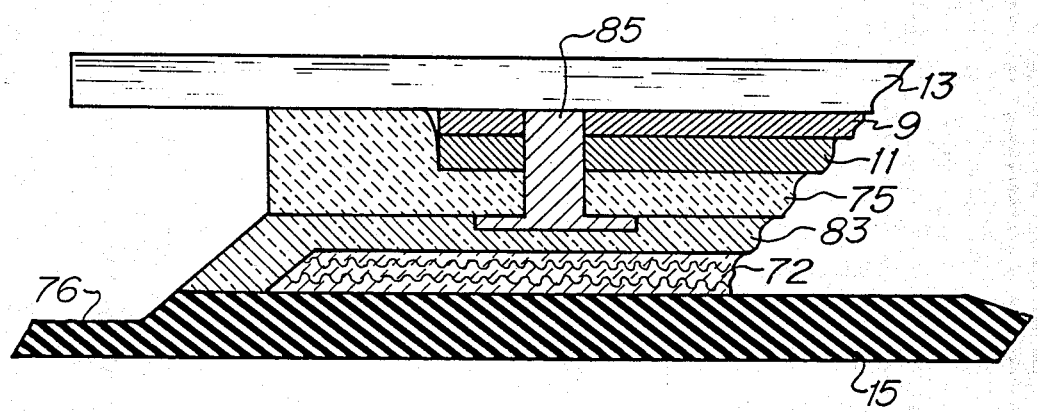
FIG. 18 is a partial sectional view of another embodiment of the present invention in which registration pins are mounted with respect to the membrane.
Figure 19:
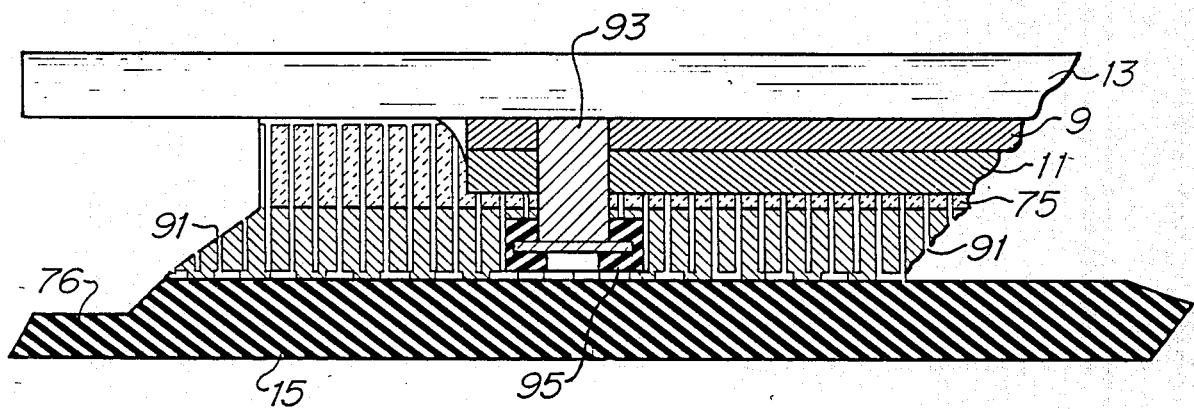
FIG. 19 is a partial sectional view of another embodiment of the invention in which a substantially rigid layer is disposed within the chamber formed by the membrane.

With reference to FIGS. 18 and 19, there are shown additional embodiments of the present invention in which the glass platen 13 is disposed to set down upon the photographic sheets 9, 11 that are initially positioned in proper registration on the registration pins 85 which are supported on the blanket 15. Specifically, in the embodiment illustrated in FIG. 19, a layer of rigid, non-stretch material 91 disposed adjacent the blanket 15 exhibits rigidity and porosity and is covered with the layer 75 of soft pliable material. The rigid layer 91 also serves as the support for the retractable registration pins 93 (one shown) which are located within a recess in the layer and which are each mounted on a resilient member 95 to urge the pin into registering position while the photographic sheets are being positioned, but to allow the pin 95 to depress as the glass platen 13 bears down upon the sheets 9, 11 as the vacuum pressure differential increases.

In each of the above-described embodiments illustrated in FIGS. 10-19, the layer 83 may be formed of polyester or polyester and polyurethane materials of open cell structure to permit air flow therethrough. Alternatively, this layer may also be formed of a resilient fiber material with a layer of Teflon or Nylon fabric bonded thereto. Also, the porous layer 75 in these illustrated embodiments may be formed of vinyl/nitrile, crosslinked polyethylene, ethylene vinyl acetate, polyurethane, epichlorohydrine, or silicone polymers, all of open-cell or perforated structure.

Figure 20:
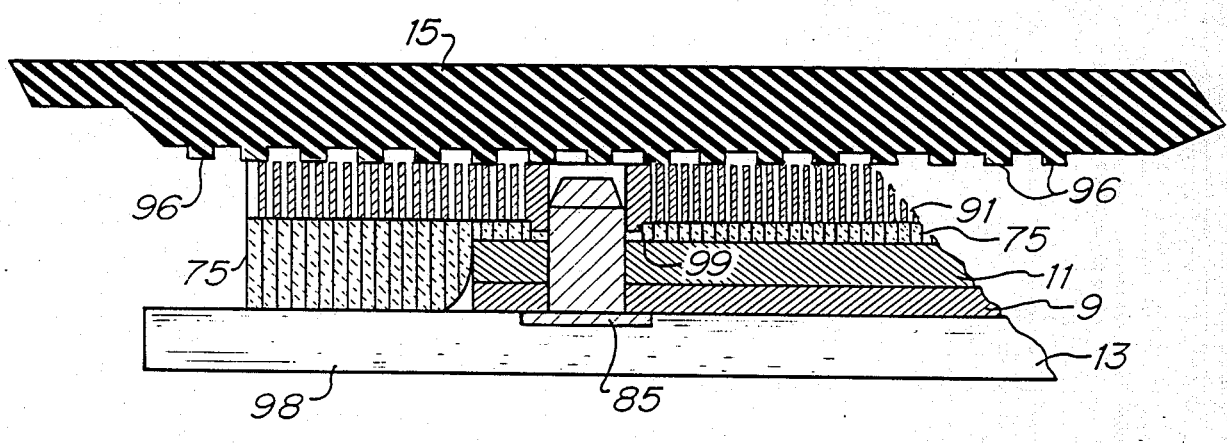
FIG. 20 is a partial sectional view of another embodiment including a substantially rigid layer registered on pins that register the photographic sheets within the chamber formed by the membrane.

Referring now to FIG. 20, there is shown a sectional view of another embodiment of the present invention in which the vacuum blanket 15 and substantially rigid layer 91 are disposed to set down upon the glass platen 13 in alignment with the pins 85 (one shown) that are firmly mounted on the glass platen 13 and that also hold the photographic sheets 9, 11 in proper registration under the blanket 15. Bushings 99 (one shown) are set into the rigid layer 91 at locations that align with and hold the layer 91 in registration with the pins 85 that are mounted in the glass planten 13. As the blanket 15 and the layer 91 are set down upon the photographic sheets 9, 11 that are registered on the pins 85, the layer 91 is also registered on the pins 85 and is inhibited from moving during the vacuum and exposure phases of operation. The rigid layer 91 preferably includes a soft, pliable layer 75 thereon to contact the photographic sheets 9, 11. This layer 75 and the rigid layer 91 may include air passages 98 therethrough, and the blanket 15 may include an embossed pattern 96 on the underside thereof to form passageways beneath the blanket 15 to facilitate the vacuum removal of residual air within the chamber formed between the blanket 15 and the glass platen 13. The rigid layer 91 may be attached to the blanket 15 to be set down therewith upon the pins 85, or the rigid layer 91 with the associated soft, pliable layer 75 attached thereto may be unattached to the blanket 15 to facilitate setting the layer 91 in position on the pins 85 prior to placing the blanket 15 over the entire layered structure.

Therefore, the vacuum blanket assembly of the present invention facilitates the rapid removal of entrapped air within the volume confined beneath a vacuum blanket, and eliminates the stresses that displace photographic sheets from proper contact registration as vacuum pressure differential increases the forces applied to compress the surfaces of the sheets together.

What is claimed is:

1. A vacuum blanket assembly for use with a radiation transmissive platen disposed to secure a photographic sheet for exposure to radiation therethrough, the assembly comprising:
   a flexible, substantally gas-impervious membrane disposed on one side of the radiation transmissive platen to form a seal therewith substantially about a peripheral boundary thereof and to receive the photographic sheet within the peripheral boundary;
   a substantially homogeneous layer of soft pliable and resilient material interposed between the blanket and the photographic sheet; and
   a flexible layer of dimensionally stable material disposed beneath the homogeneous layer for maintaining the position of the photographic sheet relative to the radiation transmissive platen as vacuum pressure differential across the peripheral boundary increases.

2. Photographic exposure apparatus comprising:
   a radiation transmissive platen disposed to receive a photographic sheet in intimate registration with one surface for exposure thereof to a source of radiation through the platen;
   a flexible, substantially gas-impervious membrane disposed on one side of the platen for selectively forming therewith a gas-impervious chamber within a peripheral boundary for receiving the photographic sheet therein in positional registration adjacent the platen, the outer section of the membrane adjacent the peripheral boundary being thinner than the central section of the membrane that is surrounded thereby;
   an additional layer of soft, pliable material disposed on the membrane on the side thereof adjacent the platen for contacting the platen and a photographic sheet positioned adjacent thereto;
   a layer of porous material disposed intermediate the additional layer and the membrane; and
   a vacuum port coupled to the chamber for evacuating air therefrom.

3. Photographic exposure apparatus as in claim 2 wherein said additional layer is formed of porous material.

4. Photographic exposure apparatus as in claim 2 comprising:
   resilient gasket attached to the additional layer and to the layer of porous material near the peripheries thereof; and
   means selectively removably attaching the resilient gasket to the membrane within the central section thereof that is bounded by the outer section thereof.

5. Photographic exposure apparatus as in claim 4 wherein said means for attaching includes resilient tongue and groove fastening means.

6. Photographic apparatus as in claim 4 wherein said means for attaching inlcudes hook and loop fastening means.

7. Photographic exposure apparatus comprising:
   a radiation transmissive platen disposed to receive a photographic sheet in intimate registration with one surface for exposure thereof to a source of radiation through the platen;
   a flexible, substantially gas-impervious membrane disposed on one side of the platen for selectively forming therewith a gas-impervious chamber within a peripheral boundary for receiving the photographic sheet therein in positional registration adjacent the platen, the outer section of the membrane adjacent the peripheral boundary being thinner than the central section of the membrane that is surrounded thereby;
   a substantially rigid layer disposed adjacent the membrane in the central section thereof; and
   an additional layer of soft, pliable material disposed on the substantially rigid layer for contacting a photographic sheet positioned adjacent the platen.

8. Photographic apparatus as in claim 7 wherein said substantially rigid layer and said additional layer are porous to facilitate the evacuation of air from adjacent a photographic sheet.

9. A method of supporting a sheet of photographic material against a platen for exposure to radiation therethrough comprising the steps of:
   forming a pressure chamber including the platen and a gas-impervious flexible membrane as boundary walls thereof and disposed to receive the photographic material therein in proximity to the platen;
   interposing a layer of soft, pliable material between the membrane and a sheet of photographic material for conforming to differential shapes between the membrane and the photographic material adjacent the platen; and
   evacuating the pressure chamber to urge the membrane and layer against the photographic material and platen.

10. The method according to claim 9 comprising the additional step of:
    interposing a layer of dimensionally stable material between the membrane and said layer to inhibit movement of the photographic material in response to the membrane urging the photographic material against the platen.

11. The method according to claim 10 wherein said layer of dimensionally stable material includes a substantially rigid and porous layer.

12. The method according to claim 10 wherein said membrane includes a peripheral section surrounding a central section thereof that is more flexible than the central section thereof; and
    said layer of dimensionally stable material is disposed within the central section of the membrane.

13. The method according to claim 10 comprising the additional step of:
    selectively removably attaching said layer of soft, pliable material and said layer of dimensionally stable material to said membrane within a central region thereof.

14. The method according to claim 11 comprising the additional step of:
    forming a least one positioning reference for the photographic material within the rigid layer for selective depression into said layer in response to said membrane and layer urging the photographic material against the platen.

* * * * *